Sept. 4, 1923.
H. J. GWYER
REFRIGERATOR TRAP
Filed Aug. 5, 1921
1,466,827
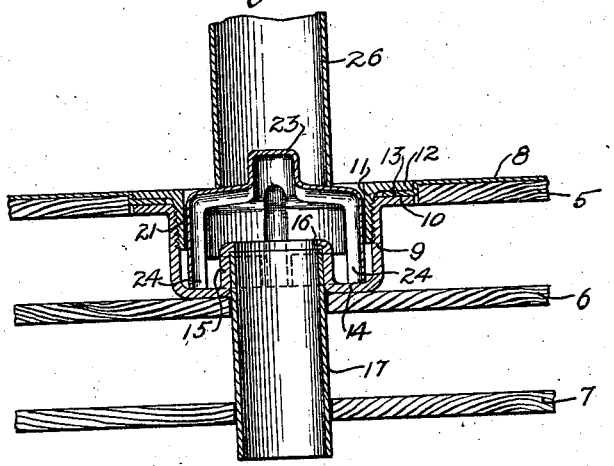
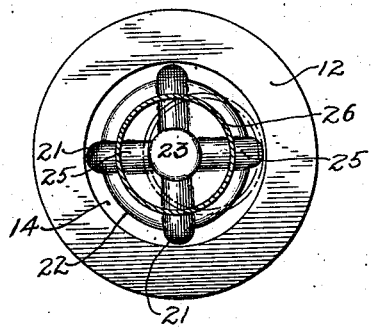
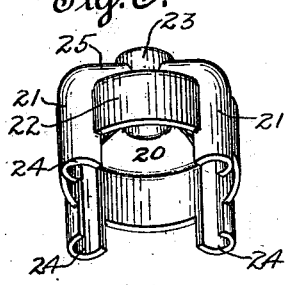
Inventor
Herbert J. Gwyer
By his Attorneys
Mitchell & Allyn Patented Sept. 4, 1923.

1,466,827

UNITED STATES PATENT OFFICE.

HERBERT J. GWYER, OF NEW YORK, N. Y.

REFRIGERATOR TRAP.

Application filed August 5, 1921. Serial No. 489,930.

*To all whom it may concern:*

Be it known that I, HERBERT J. GWYER, a citizen of the United States of America, residing at New York city, New York, have invented a new and useful Refrigerator Trap, of which the following is a specification.

My invention relates to a trap, and is particularly adapted for use in refrigerators, though its use is of course not confined thereto.

It is an object of the invention to provide a cheap yet efficient and serviceable trap.

It is a further object to provide a trap, the parts of which may be formed of pressed metal.

It is a further object to provide means for properly spacing the bowl and sealing bell of a trap away from each other.

Other objects and features of the invention will appear as the specification proceeds.

In the preferred form of my invention a bowl is provided having a drain outlet therein communicating with the interior at a point above the bottom. When the device is used as a refrigerator trap, and it is desired to secure the refrigerator lining thereto, means are provided on the trap for clamping the lining thereto. A sealing bell is positioned within the bowl and is supported therefrom. One of the members is provided with one or more projections to space the bowl and bell apart. Means may also be provided for forming a passage for fluid entering the trap through a refrigerator drainpipe.

In the drawings I have shown for illustrative purposes only, a preferred form of my invention. In said drawings, Fig. 1 is a vertical sectional view through a trap and adjacent portions of a refrigerator bottom and refrigerator drip pipe.

Fig. 2 is a top plan view of the trap shown in Fig. 1, the drip pipe being shown in section.

Fig. 3 is a perspective view of a sealing bell for a trap.

In the present instance, the trap is shown applied to the bottom of a refrigerator in which three bottom panels 5, 6, 7, have been disclosed. 8 indicates the bottom lining of the refrigerator. 9 indicates the main bowl or container of my improved trap, and a laterally extending flange 10 is provided thereon. A sleeve member 11 provided with a flange 12 may be secured to the bowl as by means of the screw threads shown. In the specific instance shown, the lining 8 is provided with an offset flange 13 fitting between the flanges 10 and 12 and preferably making a liquid tight joint. It will be noted that the panel 5 is apertured to receive the upper end of the bowl and offset lining flange. By means of such an arrangement the trap will be flush with the bottom of the refrigerator. If desired, the bottom portion 14 of the trap may rest upon or be supported from the panel member 6.

The bottom of the main bowl 9 is provided with an outlet opening which in the form shown is defined by an upstanding annular flange 15 so that the opening communicates with the interior of the bowl at a point above the bottom thereof. A short inturned lip or flange 16 may be formed on the flange 15, and against which the drainpipe 17 may abut. The drainpipe is preferably sweated to the bow or flange 15. It will be noted that the bowl above described is of such form that it may be stamped or pressed out of sheet metal. The sleeve member 11 (when the latter is used) may likewise be formed of pressed or stamped metal.

Supported within the bowl 9 is a sealing bell designated generally by the numeral 20. This bell corresponds in general to the shape of the bowl which is preferably cylindrical. One of the members, preferably the bell, is provided with a series of alternate projections 21 and depressions 22. At the upper end of the bell there may be provided with a knob or projection 23, and the space within the knob serves to increase the volume of the bell. Communication between the bowl and the bell may be afforded by spacing the latter from the bottom of the bowl by means of feet 24 projecting from the lower surface thereof. The feet in the particular instance shown are of substantially arcuate cross-section and this cross-section extends upwardly and merges into and forms the projections 21. These projections are likewise preferably extended to the top of the bell as at 25 for a purpose to be described. It will be seen that the entire bell may be and preferably is formed of pressed metal.

26 indicates a drip pipe usually provided for refrigerators. This drip pipe may rest on the upper end of the bell, and the alternate projections and depressions serve to permit liquid flowing down the drip pipe 26 to pass over the outside of the bell, and the alternate projections and depressions 21—22 serve to permit the liquid to pass between the bowl and the bell. The openings between the feet serve to permit the liquid to flow beneath the bell and through the opening in the bowl and out the drainpipe 17. The knob 23 on the bell is preferably of such size in relation to the drip pipe 26 that should the latter become displaced as shown in dot and dash lines in Fig. 2, the edge of the drip pipe would not overlap the edge of the bowl.

By stamping out the parts of my trap the latter may be rapidly produced in quantity and a uniform excellence of quality attained. By stamping out the parts, a great saving is effected over other methods, such as casting, and the resulting product is much more serviceable, and the parts are not easily broken.

Though there are many advantages in forming the parts of pressed metal, I do not wish to limit myself thereto more than required by the claims herein.

While I have described one specific embodiment of my invention, I wish it understood that various changes may be made within the scope of the appended claims.

I claim:

1. In a trap, a bowl having an outlet opening therein communicating with the interior of the bowl at a point above the bottom thereof, a sealing bell in said bowl and extending over said outlet opening, said bell being supported from the bottom of said bowl and having a passage for liquid, said bell being provided at the side with alternate projecting and depressed portions for spacing the bell and bowl apart and permitting a flow of liquid therebetween, and a knob on the upper side of said bell to position the lower end of a refrigerator drip pipe in a lateral direction, said bell being provided with alternate projecting and depressed portions along the top for spacing the lower end of a drip pipe and permitting a flow of liquid.

2. In a trap, a bowl having an opening in the bottom thereof and communicating with the interior at a point above the bottom, a pressed metal sealing bell in said bowl above said outlet opening, said bell having a series of projections and depressions on the top thereof, whereby a refrigerator drip pipe resting on the bell will be spaced away from the latter to permit liquid to flow between the drainpipe and bell.

3. In a trap, a bowl having an opening in the bottom thereof and communicating with the interior at a point above the bottom, a pressed metal sealing bell supported within said bowl and spaced from the sides thereof, said bell having a raised rib pressed from the metal of the bell for supporting a refrigerator drip pipe from the bell and removed from the upper end thereof, whereby a passage for liquid is provided between the bell and drip pipe.

4. As an article of manufacture, a pressed metal sealing bell for a trap comprising, a bell having projecting feet, said bell being formed with alternate projecting and depressed portions, each of said feet merging into one of said portions.

HERBERT J. GWYER.